United States Patent
McBrien

(10) Patent No.: US 10,655,622 B2
(45) Date of Patent: May 19, 2020

(54) DUAL MODE FUEL PUMP SYSTEM

(71) Applicant: Hamilton Sundstrand Corporation, Charlotte, NC (US)

(72) Inventor: Gary M. McBrien, S. Glastonbury, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 491 days.

(21) Appl. No.: 14/812,758

(22) Filed: Jul. 29, 2015

(65) Prior Publication Data

US 2017/0030347 A1 Feb. 2, 2017

(51) Int. Cl.
*F04B 49/24* (2006.01)
*F02C 9/26* (2006.01)
(Continued)

(52) U.S. Cl.
CPC .............. *F04B 49/24* (2013.01); *F02C 9/263* (2013.01); *F04B 9/123* (2013.01); *F04B 19/22* (2013.01); *F04B 23/02* (2013.01); *F04B 53/14* (2013.01); *F15B 1/024* (2013.01); *F15B 11/072* (2013.01); *F16K 15/00* (2013.01); *G05D 7/0635* (2013.01); *F15B 2211/212* (2013.01); *F15B 2211/50536* (2013.01); *F15B 2211/50554* (2013.01); *F15B 2211/5158* (2013.01);
(Continued)

(58) Field of Classification Search
CPC .......... F04B 49/24; F04B 19/22; F04B 9/123; F04B 53/14; F04B 23/02; G05D 7/0635; F16K 15/00; F02C 9/263; F02C 9/36; F02C 9/38; F02C 9/48; F02C 7/22; F15B 1/024; F15B 11/072; F15B 2211/6313; F15B 2211/5158; F15B 2211/50554; F15B 2211/212; F15B 2211/565; F15B 2211/50536; F15B 2211/625
See application file for complete search history.

(56) References Cited

U.S. PATENT DOCUMENTS 6,065,451 A * 5/2000 Lebrun ................... F02C 9/263
                                                      123/454
6,412,476 B1 * 7/2002 Thompson ........... B60K 15/077
                                                      123/516

(Continued)

OTHER PUBLICATIONS

EPSR for EP Application No. 1618702.8, Issued Dec. 22, 2016, 8 pages.

*Primary Examiner* — Kevin F Murphy
*Assistant Examiner* — Patrick C Williams
(74) *Attorney, Agent, or Firm* — Cantor Colburn LLP

(57) ABSTRACT

A method and system providing a pressurized fluid includes a pump having a pump inlet and a pump outlet, the pump to provide a fluid flow, a bypass path to direct the fluid flow from the pump outlet to the pump inlet, a load path having a load path pressure, the load path including: a fluid accumulator to accumulate a fluid volume, and at least one load device, a bypass regulator valve in fluid communication with the pump outlet, the bypass path, and the load path, and a controller to direct the fluid flow to the load path in response to the load path pressure being less than a low load path threshold pressure via the bypass regulator valve and to direct the fluid flow to the bypass path in response to the load path pressure being greater than a high load path threshold pressure via the bypass regulator valve.

20 Claims, 2 Drawing Sheets

(51) Int. Cl.

| | | |
|---|---|---|
| *F15B 11/072* | (2006.01) | |
| *F15B 1/02* | (2006.01) | |
| *F04B 9/123* | (2006.01) | |
| *F04B 19/22* | (2006.01) | |
| *F04B 23/02* | (2006.01) | |
| *F04B 53/14* | (2006.01) | |
| *F16K 15/00* | (2006.01) | |
| *G05D 7/06* | (2006.01) | |

(52) U.S. Cl.
CPC ... *F15B 2211/565* (2013.01); *F15B 2211/625* (2013.01); *F15B 2211/6313* (2013.01)

(56) References Cited

U.S. PATENT DOCUMENTS

| | | | |
|---|---|---|---|
| 8,434,508 B2* | 5/2013 | Terada | F16K 17/06 137/115.13 |
| 2010/0089026 A1 | 4/2010 | Baker et al. | |
| 2012/0090308 A1 | 4/2012 | Yuan et al. | |
| 2012/0093968 A1 | 4/2012 | Yuan | |
| 2012/0315152 A1 | 12/2012 | Baker | |
| 2015/0020884 A1* | 1/2015 | Baker | F02M 37/0052 137/1 |

* cited by examiner

DUAL MODE FUEL PUMP SYSTEM

BACKGROUND

The subject matter disclosed herein relates to pumping systems, and more particularly, to a system and a method for providing a dual mode pumping system for an aircraft.

Typically, fuel pumps are utilized to provide pressurized fuel to aircraft systems, such as fuel injectors, hydraulic actuators, fueldraulic actuators, etc. Often, fuel pumps are selected for fuel flow requirements under maximum load and utilize pressure regulation systems that return excess flow back to a pump inlet or a tank during periods of low fuel flow requirements. The use of such pressure regulation systems can produce excess waste heat and consume power.

BRIEF SUMMARY

According to an embodiment, a system to provide a pressurized fluid includes a pump having a pump inlet and a pump outlet, the pump to provide a fluid flow, a bypass path to direct the fluid flow from the pump outlet to the pump inlet, a load path having a load path pressure, the load path including: a fluid accumulator to accumulate a fluid volume, and at least one load device, a bypass regulator valve in fluid communication with the pump outlet, the bypass path, and the load path, and a controller to direct the fluid flow to the load path in response to the load path pressure being less than a low load path threshold pressure via the bypass regulator valve and to direct the fluid flow to the bypass path in response to the load path pressure being greater than a high load path threshold pressure via the bypass regulator valve.

According to an embodiment a method to provide a pressurized fluid includes providing a fluid flow via a pump having a pump inlet and a pump outlet, selectively directing the fluid flow to a load path to direct the fluid flow to at least one load device in response to a load path pressure being less than a low load path threshold pressure via a bypass regulator valve and a controller, accumulating a fluid volume via a fluid accumulator in fluid communication with the load path, and selectively directing the fluid flow from the pump outlet to the pump inlet via a bypass path in response to the load path pressure being greater than a high load path threshold pressure via the bypass regulator valve and the controller.

According to an embodiment, a system to provide a pressurized fuel includes a pump having a pump inlet and a pump outlet, the pump to provide a fuel flow, a fuel tank in fluid communication with the pump inlet, a bypass path to direct the fuel flow from the pump outlet to the pump inlet, a load path having a load path pressure, the load path including: a fuel accumulator to accumulate a fuel volume, and at least one fueldraulic actuator, a bypass regulator valve in fluid communication with the pump outlet, the bypass path, and the load path, and a controller to direct the fuel flow to the load path in response to the load path pressure being less than a low load path threshold pressure via the bypass regulator valve and to direct the fuel flow to the bypass path in response to the load path pressure being greater than a high load path threshold pressure via the bypass regulator valve.

Technical function of the embodiments described above includes a load path having a load path pressure, the load path including: a fluid accumulator to accumulate a fluid volume, and at least one load device, a bypass regulator valve in fluid communication with the pump outlet, the bypass path, and the load path, and a controller to direct the fluid flow to the load path in response to the load path pressure being less than a low load path threshold pressure via the bypass regulator valve and to direct the fluid flow to the bypass path in response to the load path pressure being greater than a high load path threshold pressure via the bypass regulator valve.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
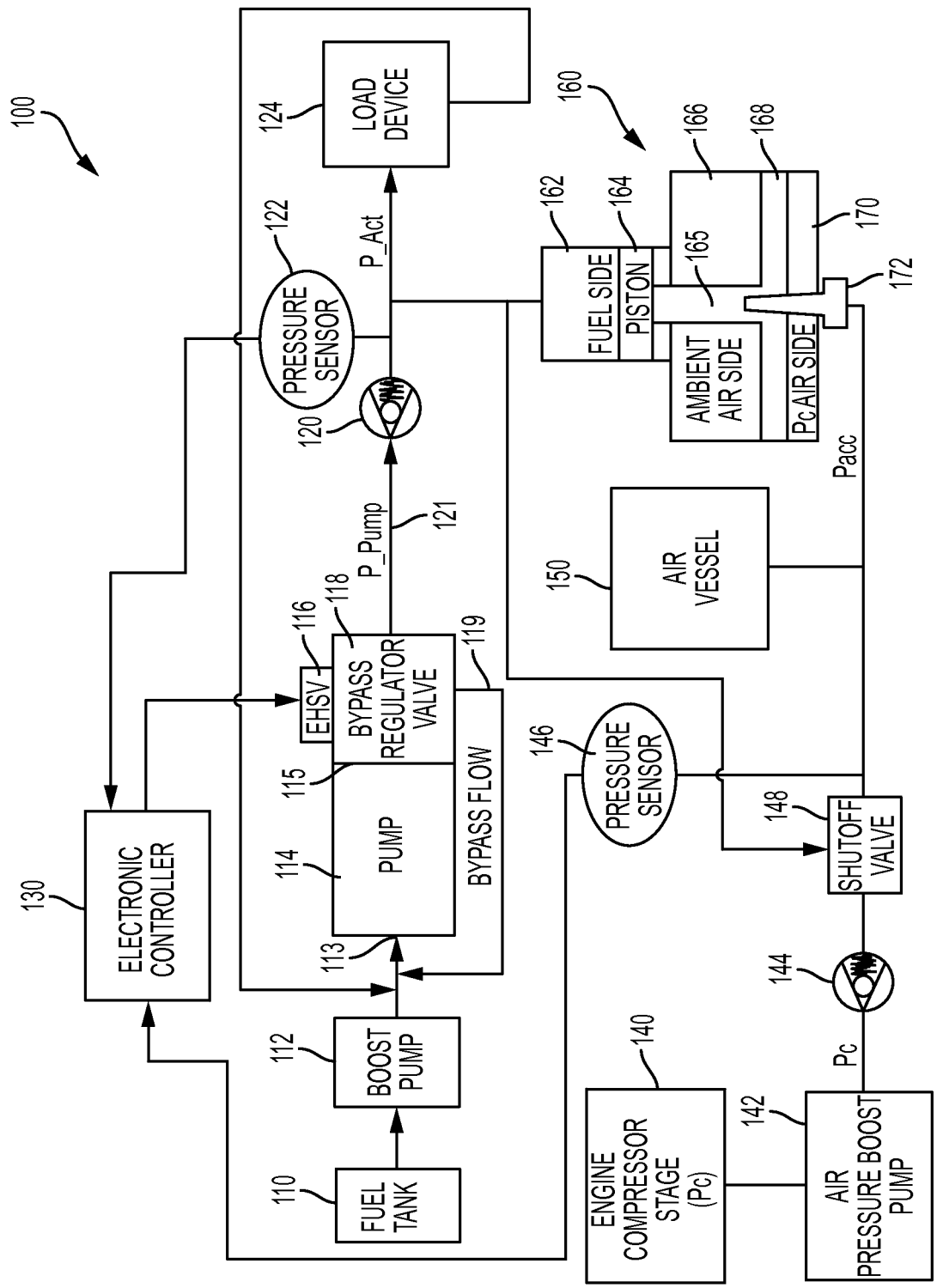
FIG. 1 is a schematic view of one embodiment of a pressurized fluid system for use with a load device.

Referring now to the drawings, FIG. 1 shows a pressurized fluid system 100. In the illustrated embodiment, the pressurized fluid system 100 includes a pump 114, a bypass regulator valve 118, a fluid check valve 120, a load device 124, an accumulator 160 and an electronic controller 130. The pressurized fluid system 100 can be utilized for any suitable application including, but not limited to, supplying fuel to engines, supplying pressurized hydraulic fluid to actuators, supplying pressurized fuel to fueldraulic actuators, etc. In the illustrated embodiment, the pressurized fluid system 100 delivers fuel to fueldraulic actuators. Advantageously, the use of the pressurized fluid system 100 minimizes excess waste heat and lost power.

In the illustrated embodiment, the pump 114 can receive fluid via an inlet 113 and provide a pressurized flow via an outlet 115. In the illustrated embodiment, the pump 114 can receive fluid from a fuel tank 110. In certain embodiments, the fluid flow within the system 100 can be fuel or any other suitable hydraulic fluid. In certain embodiments, the fluid flow is pressurized via a boost pump 112 before delivered to the inlet 113 of the pump 114. In the illustrated embodiment, the pump 114 is a positive displacement pump. In other embodiments, the pump 114 can be any suitable type of pump. Typically, pumps for pressurized fluid systems are selected based on a maximum flow rate and pressure requirements of the pressurized fluid system 100. Typical operation of such pumps can create excess waste heat. Advantageously, in the illustrated embodiment, the pump 114 of system 100 can operate as a dual mode pump to minimize excess heat and power consumption.

In the illustrated embodiment, the outlet 115 of the pump 114 is in fluid communication with a bypass regulator valve 118. In certain embodiments, the bypass regulator valve 118 is actuated by the electrohydraulic servo valve 116.

In the illustrated embodiment, the bypass regulator valve 118 can direct the fluid flow from the pump outlet 115 to either the bypass path 119 or the load path 121. The electrohydraulic servo valve 116 in conjunction with the bypass regulator valve 118 allows the electronic controller 130 to selectively direct the fluid flow of the pump 114 between the bypass path 119 and the load path 121.

In certain embodiments, the bypass path 119 can redirect flow from the pump outlet 115 back to the pump inlet 113. In certain embodiments, the bypass path 119 can direct the fluid flow back to the fuel tank 110.

In the illustrated embodiment, the load path 121 includes the check valve 120 and the load device 124. The load path 121 allows fluid communication between the pump 114 and the load device 124 to allow operation of the load device 124. In the illustrated embodiment, a fueldraulic actuator can be operated via the pressure provided by the pump 114.

In the illustrated embodiment, the load path 121 includes a fluid check valve 120. The fluid check valve 120 can allow fluid flow from the pump 114 to enter the load path 121, and prevents the back flow of fluid from load path 121 back to the pump 114. During periods of low pressure operation of the pump 114, the fluid check valve 120 prevents higher pressure of the load path 121 from migrating back the pump 114 and other portions of the system 100. Advantageously, the fluid check valve 120 can allow for higher pressures within the load path 121 than provided by the pump 114.

In the illustrated embodiment, the pump 114 can provide pressurized fluid to the load device 124. In certain embodiments, the load device 124 is an actuator. In the illustrated embodiment, the load devices 124 are fueldraulic actuators that utilize fuel as a working hydraulic fluid. Advantageously, the use of fueldraulic actuators allows fuel to be used for hydraulic actuation purposes to simplify the system 100. In certain embodiments, the load device 124 can be a burner for an engine or any other suitable hydraulic or fueling device. In the illustrated embodiment, a return path from an outlet of the load device 124 is in fluid communication with the fuel tank or the pump 114. Excess and unneeded fluid can be diverted via the return path.

In the illustrated embodiment, an accumulator 160 is utilized to accumulate pressure within the load path 121. Advantageously, the accumulator 160 allows for liquid of a fluid flow to be stored, pressurized and later released within the load path 121 to enable the dual mode operation of the pump 114. In the illustrated embodiment, the accumulator 160 includes a fluid side piston 164 and an air side piston 168.

In the illustrated embodiment, the fluid volume 162 is defined by the fluid side piston 164. The fluid volume 162 receives and accumulates fluid flow from the pump 114. A rod 165 connects to the air side piston 168 to the fluid side piston 164 to allow forces between fluid circuits to be transferred. In the illustrated embodiment, the pressurized air volume 170 defined by the air side piston 170 is pressurized to act against the ambient air volume 166 defined by the opposite side of the air side piston 168 and the fluid volume 162. The ratio between the fluid side piston 164 and the air side piston 168 can be configured to provide a desired relationship between the load path 121 pressure and the air pressure within the pressurized air volume 170. In the illustrated embodiment, the pressurized air volume 170 is supplied from the engine compressor stage 140. In certain embodiments, a position sensor 172, including, but not limited to a linear variable differential transformer, is utilized to measure the position of the air side piston 168. The position sensor 172 can be utilized to determine if pressurized air provided by engine compressor stage 140 should be increased or decreased as necessary to adjust the level of the pressurized air volume 170 within the accumulator 160.

In the illustrated embodiment, the engine compressor stage 140 can provide sufficient air pressure to pressurize the fluid volume 162. In certain embodiments, the air flow from the compressor stage 140 can be boosted via an air pressure boost pump 142.

In the illustrated embodiment, an air check valve 144 can prevent backflow of air due to pressure from the accumulator 160. In certain embodiments a shutoff valve 148 is utilized to prevent or release excess air pressure within the system 100. In certain embodiments, an air vessel 150 can be utilized to facilitate a desired range of air volume within the pressurized air volume 170.

In the illustrated embodiment, an electronic controller 130 can control the operation of the pump 114 in response to the pressure within the load path 121. The electronic controller 130 can allow for two modes of operation with respect to the pump 114.

In the first mode of operation, the electronic controller 130 can control the electrohydraulic servo valve 116 to direct flow from the pump 114 to the load path 121. In the first mode of operation, fluid flow from the pump 114 can be directed to the load devices 124. During the first mode of operation, fluid flow can be directed to the fluid volume 162 of the accumulator 160. In the illustrated embodiment, the accumulator 160 can store fluid within the fluid volume 162 and maintain a desired pressure within the load path 121. The pressure within the load path 121 can be sensed via a pressure sensor 122. Similarly, the pressure within the air volume 170 of the accumulator 160 can be measured via a pressure sensor 146.

In the illustrated embodiment, pressure within the load path 121 is compared to a high pressure threshold. In the illustrated embodiment, the pump 114 can be in fluid communication with the load path 121 until the load path pressure exceeds the high pressure threshold. After the pressure of the load path exceeds the high pressure threshold, the controller 130 can perform the second mode of operation.

In the second mode of operation, the controller 130 can control the electrohydraulic servo valve 116 can direct the pump 114 fluid flow to the inlet of the pump 114 via a bypass path 119. In other embodiments, the bypass path 119 can direct to the fuel tank 110. Advantageously, waste heat and power loss is reduced during bypass operation.

During the bypass mode of operation, fluid flow demands of the load devices 124 are supplied by the accumulated fluid within the fluid volume 162 of the accumulator 160. In the illustrated embodiment, the accumulator 160 can be configured to supply a suitable amount of fluid flow during the bypass operation contingent on the load device 124 characteristics and operation demands. In the illustrated embodiment, the pressure within the load path 121 is compared to a low pressure threshold. In the illustrated embodiment, the pump 114 can be in fluid communication with the bypass path 119 until the load path pressure is less than the low pressure threshold. After the pressure of the load path is below the low pressure threshold, the controller 130 can resume the first mode of operation to direct flow from the pump 114 to the load path 121.

In case of malfunctions, the controller 130 can default to providing a fluid communication between the pump 114 and the load path 121. In certain embodiments, the controller 130 can control the engagement and disengagement of the load devices 124.

Figure 2:
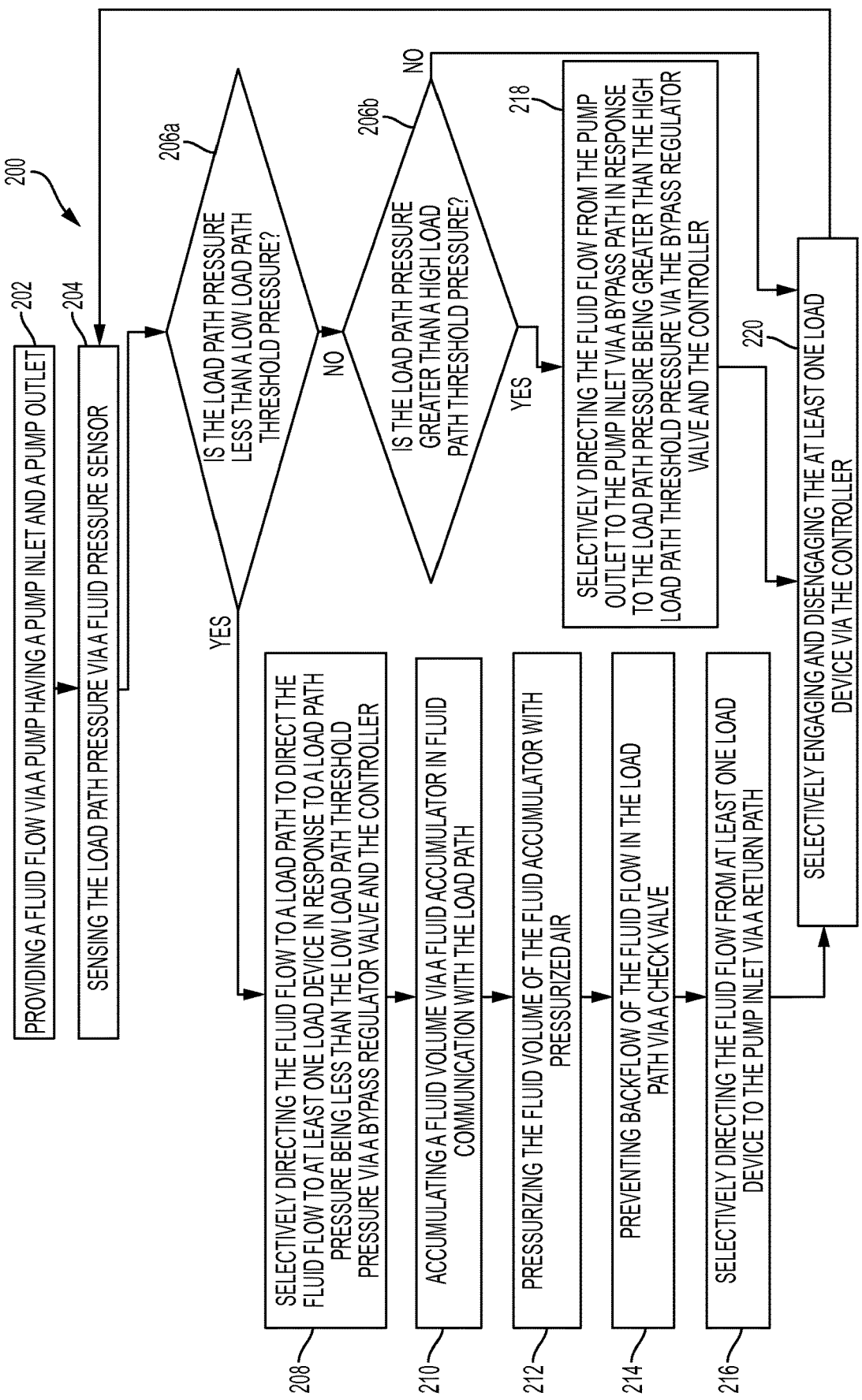
FIG. 2 is a flow chart of one embodiment of a method to provide a pressurized fluid.

Referring to FIG. 2, a method 200 for providing a pressurized fluid is shown. In operation 202, a fluid flow is provided via a pump. In certain embodiments, the pump has a pump inlet and a pump outlet. In the illustrated embodiment, the pump can receive fluid via an inlet and provide a pressurized flow via an outlet. In the illustrated embodiment, the pump is a positive displacement pump. In other embodiments, the pump can be any suitable type of pump.

In operation 204, the load path pressure is sensed via the fluid pressure sensor to be utilized by the controller. In operations 206a and 206b, the load path pressure is compared to predetermined thresholds via a controller. The controller compares the load path pressure to a low load path threshold pressure in operation 206a and to a high load path threshold pressure in operation 206b. In operation 206a, the controller can direct fluid flow to the load path in response to the load path pressure being less than the low load path threshold pressure, as described in operation 208. Alternatively, in operation 206b, the controller can direct fluid flow to the bypass path in response to the load path pressure being greater than the high load path threshold pressure, as described in operation 218. Further, if the load path pressure is between the low load path threshold pressure and the high load path threshold pressure, the controller can continue to engage and disengage load devices as described in operation 220.

In operation 208, the fluid flow is selectively directed to a load path to direct the fluid flow to at least one load device in response to a load path pressure being less than a low load path threshold pressure via a bypass regulator valve. In certain embodiments, the bypass regulator valve is controlled via a controller. In certain embodiments, the fluid flow remains directed to the load path until operation 218 is performed.

In operation 210, a fluid volume is accumulated via a fluid accumulator in fluid communication with the load path. Advantageously, the accumulator allows for liquid of a fluid flow to be stored, pressurized and later released within the load path to enable the dual mode operation of the pump. In the illustrated embodiment, the accumulator includes a fluid side piston and an air side piston.

In operation 212, the fluid volume in the fluid accumulator is pressurized via pressurized air. In the illustrated embodiment, the pressurized air volume defined by the air side piston is pressurized to act against the ambient air volume defined by the opposite side of the air side piston and the fluid volume.

In operation 214, the backflow of the fluid flow is prevented via a check valve to prevent back flow into the load path.

In operation 216, the fluid flow is directed from the load device to the pump inlet via the return path.

In operation 218, if the load path pressure is greater than a high load path threshold pressure, the fluid flow is directed from the pump outlet to the pump inlet via a bypass path. In the illustrated embodiment, pressure within the load path is compared to a high pressure threshold. After the pressure of the load path exceeds the high pressure threshold, the controller can direct flow to the bypass path. In certain embodiments, the fluid flow remains directed to the bypass path until operation 208 is performed.

In operation 220 the load devices can be engaged and disengaged by the controller. In the illustrated embodiment, the method 200 can continue to sense the load path pressure as described in operation 204, compare the load path pressure to high and low thresholds as described in operations 206a and 206b, and selectively perform operations 208-220 in response to the comparisons performed in operations 206a and 206b.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A system to provide a pressurized fluid, comprising:
    a pump having a pump inlet and a pump outlet, the pump to provide a fluid flow;
    a bypass path to direct the fluid flow from the pump outlet to the pump inlet;
    a load path having a load path pressure, the load path including a fluid accumulator to accumulate a fluid volume and at least one load device;
    a bypass regulator valve in exclusive fluid communication with the pump outlet, the bypass path, and the load path, the bypass regulator valve comprising a body, an inlet side of the body, an outlet side of the body opposite the inlet side and a sidewall of the body extending between the inlet and outlet sides and being disposed immediately adjacent to the pump outlet such that the bypass path and the load path directly emerge from the sidewall and the outlet side, respectively; and
    a controller to direct the fluid flow to the load path in response to the load path pressure being less than a low load path threshold pressure via the bypass regulator valve and to direct the fluid flow to the bypass path in response to the load path pressure being greater than a high load path threshold pressure via the bypass regulator valve.

2. The system of claim 1, wherein the bypass regulator valve is actuated by an electrohydraulic servo valve which is coupled directly to the body of the bypass regulator valve and which is controlled by the controller.

3. The system of claim 1, the load path further including a fluid pressure sensor to sense the load path pressure.

4. The system of claim 1, wherein the controller engages and disengages the at least one load device.

5. The system of claim 1, wherein the pressurized fluid is a fuel.

6. The system of claim 1, wherein the at least one load device is at least one actuator.

7. The system of claim 1, wherein the at least one load device is in fluid communication with a return path, the return path to direct the fluid flow to the pump inlet.

8. The system of claim 1, wherein the fluid accumulator receives pressurized air to pressurize the fluid volume of the fluid accumulator.

9. The system of claim 1, wherein the load path includes a check valve disposed in the load path between the outlet side of the bypass regulator valve and a location at which the load path pressure is sensed to prevent backflow of the fluid flow.

10. A method to provide a pressurized fluid, comprising:
    providing a fluid flow via a pump having a pump inlet and a pump outlet;
    disposing a bypass regulator valve comprising a body, an inlet side of the body, an outlet side of the body opposite the inlet side and a sidewall of the body extending between the inlet and outlet sides such the inlet side is immediately adjacent to and in exclusive fluid communication with the pump outlet;

disposing a bypass path and a load path such that the bypass path and the load path directly emerge from the sidewall and the outlet side, respectively;

selectively directing the fluid flow to the load path to direct the fluid flow to at least one load device in response to a load path pressure being less than a low load path threshold pressure via the bypass regulator valve and a controller;

accumulating a fluid volume via a fluid accumulator in fluid communication with the load path; and selectively directing the fluid flow from the pump outlet to the pump inlet via the bypass path in response to the load path pressure being greater than a high load path threshold pressure via the bypass regulator valve and the controller.

11. The method of claim 10, further comprising:

directly coupling an electrohydraulic servo valve to the body of the bypass regulator valve; and controlling the electrohydraulic servo valve to actuate the bypass regulator valve.

12. The method of claim 10, further comprising sensing the load path pressure via a fluid pressure sensor.

13. The method of claim 10, further comprising selectively engaging and disengaging the at least one load device via the controller.

14. The method of claim 10, wherein the at least one load device is at least one actuator.

15. The method of claim 10, further comprising selectively directing the fluid flow from at least one load device to the pump inlet via a return path.

16. The method of claim 10, further comprising pressurizing the fluid volume of the fluid accumulator with pressurized air.

17. The method of claim 10, further comprising preventing backflow of the fluid flow in the load path via a check valve disposed between the outlet side of the bypass regulator valve and a location at which the load path pressure is sensed.

18. A system to provide a pressurized fuel, comprising:

a pump having a pump inlet and a pump outlet, the pump to provide a fuel flow;

a fuel tank in fluid communication with the pump inlet;

a bypass path to direct the fuel flow from the pump outlet to the pump inlet;

a load path having a load path pressure, the load path including a fuel accumulator to accumulate a fuel volume and at least one fueldraulic actuator;

a bypass regulator valve in exclusive fluid communication with the pump outlet, the bypass path, and the load path, the bypass regulator valve comprising a body, an inlet side of the body, an outlet side of the body opposite the inlet side and a sidewall of the body extending between the inlet and outlet sides and being disposed such that the inlet side is immediately adjacent to the pump outlet and such that the bypass path and the load path directly emerge from the sidewall and the outlet side, respectively;

an electrohydraulic servo valve directly coupled to the body of the bypass regulator valve; and a controller configured to control the electrohydraulic servo valve to actuate the bypass regulator valve to direct the fuel flow to the load path in response to the load path pressure being less than a low load path threshold pressure via the bypass regulator valve and to direct the fuel flow to the bypass path in response to the load path pressure being greater than a high load path threshold pressure via the bypass regulator valve.

19. The system of claim 18, wherein the fuel accumulator receives pressurized air from an engine compressor stage to pressurize the fuel volume of the fuel accumulator.

20. The system of claim 18, wherein the load path includes a check valve disposed in the load path between the outlet side of the bypass regulator valve and a location at which the load path pressure is sensed to prevent backflow of the fuel flow.

* * * * *